Sept. 28, 1965    W. R. BAUER    3,209,094
PRESSURE SWITCH WITH HIGH AND LOW PRESSURE SPRING ADJUSTMENTS
Filed Nov. 5, 1962    2 Sheets-Sheet 1

INVENTOR
WERNER ROBERT BAUER

BY Robert R Caudor

ATTORNEY

Sept. 28, 1965 W. R. BAUER 3,209,094
PRESSURE SWITCH WITH HIGH AND LOW PRESSURE SPRING ADJUSTMENTS
Filed Nov. 5, 1962 2 Sheets-Sheet 2
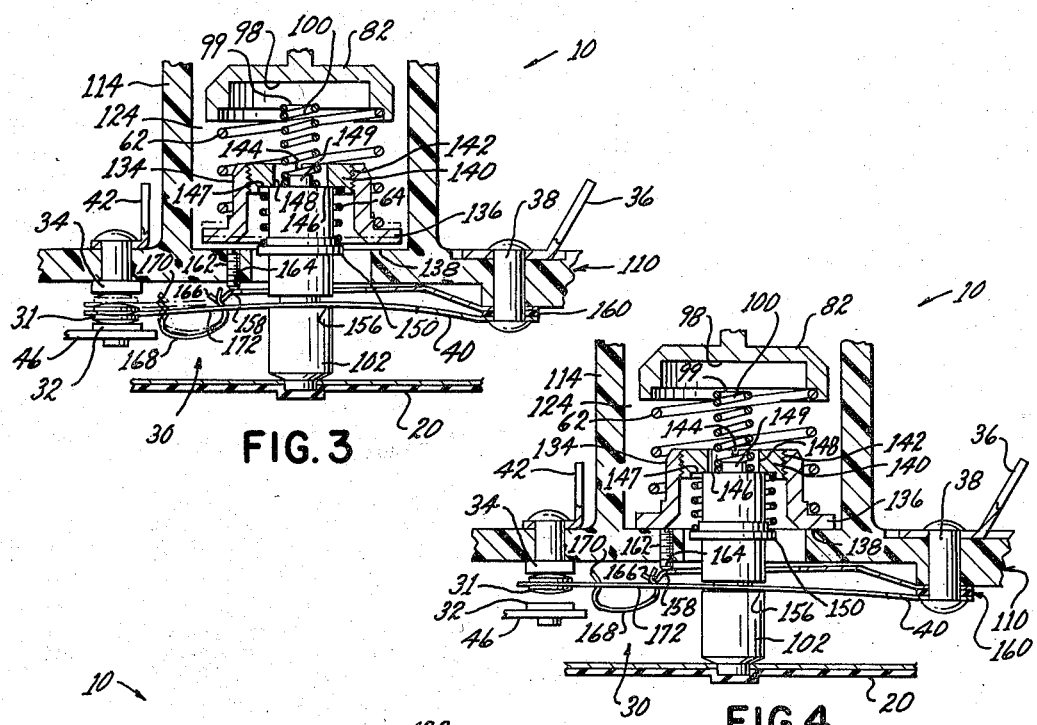
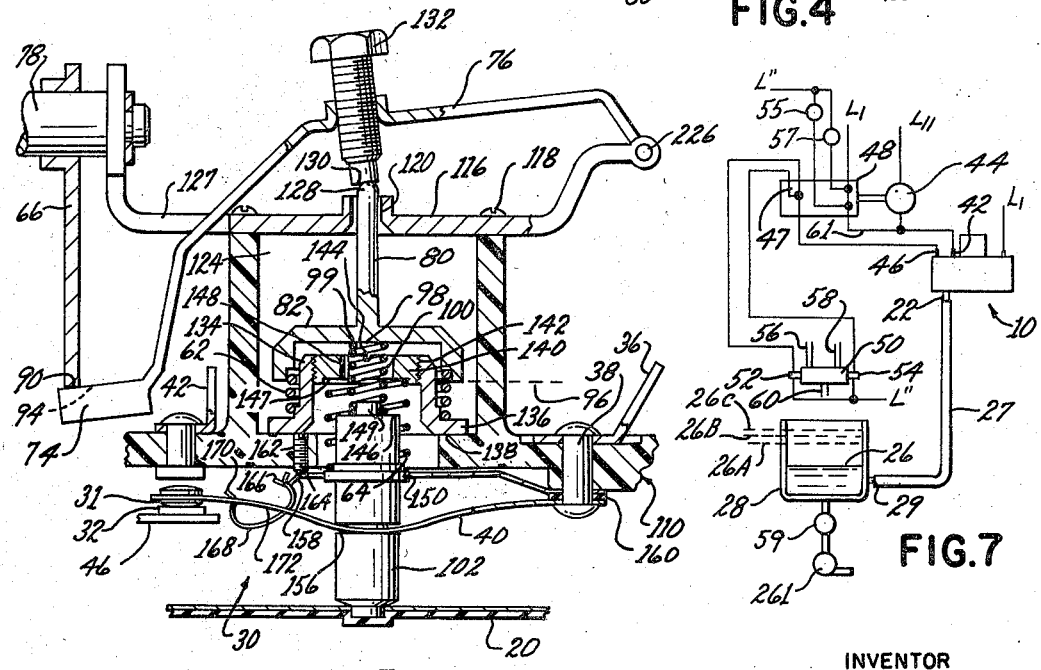
INVENTOR
WERNER ROBERT BAUER
BY *Robert R Caudor*
ATTORNEY United States Patent Office 3,209,094
Patented Sept. 28, 1965

3,209,094
PRESSURE SWITCH WITH HIGH AND LOW
PRESSURE SPRING ADJUSTMENTS
Werner Robert Bauer, Columbus, Ohio, assignor to
Robertshaw Controls Company, a corporation of
Delaware
Filed Nov. 5, 1962, Ser. No. 235,365
7 Claims. (Cl. 200—83)

This invention relates to a pressure responsive control which operates in response to fluid pressures.

Among its many uses, this control may be used to control the filling operation of a container, such as the tub of a washing machine and the like.

The control, when used to control such a filling operation, has an adjustment means movable to a plurality of adjustment positions to select the desired fill limit, such as "low" fill, "medium" fill, and "high" fill.

If the adjustment means has been placed in the "low" fill or the "medium" fill positions, and the container or tub has been filled to the selected fill limit, the adjustment means can, if desired, be moved to a higher fill limit, such as "medium" fill or "high" fill, as the case may be, and the energy controller within the apparatus, such as an electric snap switch or valve, is automatically restored or reset to a filling position so the container or tub can continue to be filled to the newly selected higher fill limit.

The control is so constructed that the energy controller, such as the electric snap switch or valve, is also reset to a filling position at a constant low water level or low pressure value during the emptying of the tub. This is accomplished independently of the position of the variable high pressure or variable fill limit adjustment.

The responsiveness of the energy controller, such as the electric snap switch or valve, so it can be automatically reset when adjustment is being made between relatively high and variable high pressure conditions or fill level conditions, and also so it is automatically reset in response to constant low pressure or low level emptying conditions is one of the features of this invention. It is useful in the control of special rinsing operations and the like, in automatic washing machines, or in similar situations.

The invention is specifically disclosed in connection with the filling and emptying operations of a liquid container, such as the tub of an automatic washing machine, for the sake of a clear understanding of the invention. However, the invention is applicable to the control of other apparatus, as is obvious.

Other features of this invention are apparent from this description, the appended claimed subject matter, and the accompanying drawings, in which:

FIGURE 3 shows the parts of FIGURE 2 moved to positions produced slightly before the tub is filled to the selected fill level, such as "low" fill, "medium" fill, or "high" fill, and with switch about to be snapped to high pressure actuated position.

FIGURE 4 shows the parts of FIGURES 2 and 3 with the switch remaining in high pressure actuated position and other parts moved to positions produced as the tub is in an initial emptying stage.

FIGURE 5 shows the parts of FIGURES 2, 3 and 4 in positions produced while the adjustment means of the control is being adjusted from one fill position such as from "low" fill to "medium" fill, or from "medium" fill to "high" fill, or vice versa, and with the switch in reset, or low pressure actuated position.

FIGURE 7 is a diagrammatic view of the control connected to the tub of a washing machine, and the like.

Figure 1:
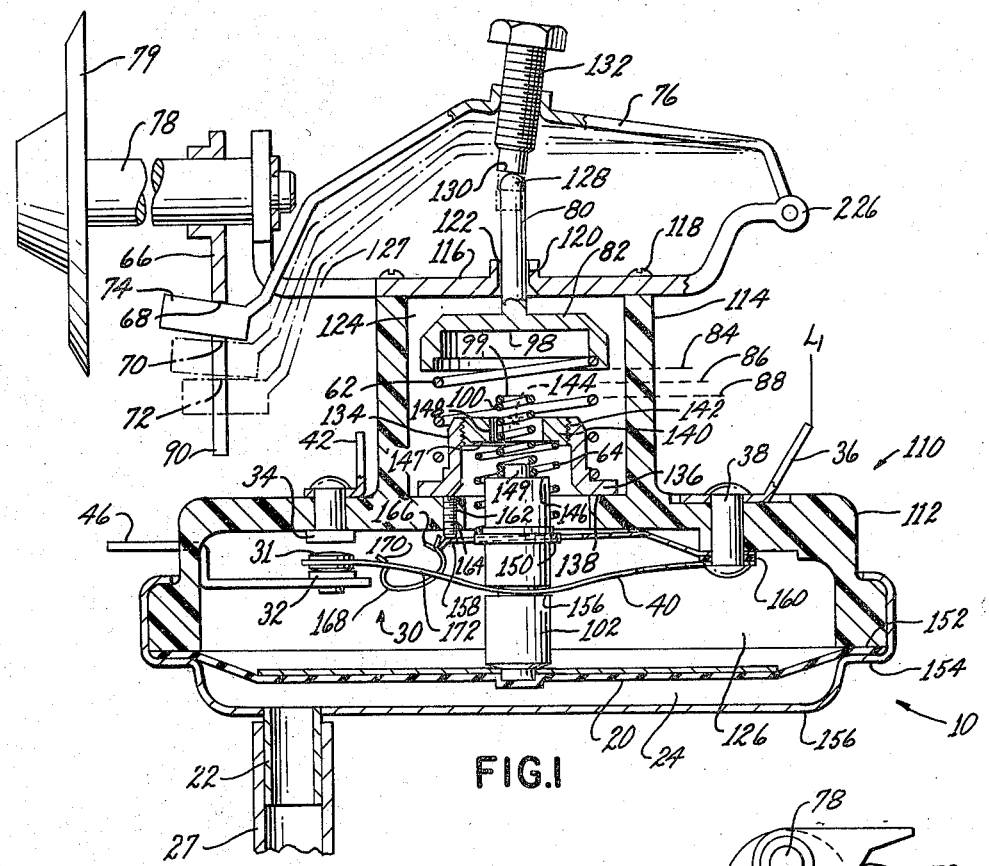
FIGURE 1 shows the control with the control parts in positions corresponding to a substantially empty washing machine tub, with the switch in low pressure actuated position.

A control 10, according to this invention, may include a pressure member or flexible diaphragm 20 which is movable in response to varying relatively high and relatively low pressures applied to the under side of the pressure member 20. These varying pressures may be produced by fluid entering and leaving an inlet or connector 22 which is connected to a pressure chamber 24 adjacent the diaphragm 20. As an example, the fluid entering and leaving the connector 22 may be compressed air actuated by the water levels 26, 26A, 26B and 26C in a washing machine tub diagrammatically indicated at 28. A connecting tube 27 may be provided between the connector 29 of the tub 28 and the connector 22 of the control. This connection may be of a well known type which produces varying pressures in chamber 24 corresponding to the varying water levels in the tub 28.

An energy controller, such as the electric snap switch or valve 30, is snapped by the pressure member or diaphragm 20 between a low pressure actuated position in which the movable contact member 31 contacts the stationary contact member 32, as in FIGURES 1, 2, 3 and 5 and a high pressure actuated position, in which the movable contact member 31 contacts the stationary contact member 34, as in FIGURE 4.

By way of example, electrical energy may flow from a connector 36 from a suitable supply wire L' through the post 38, switch arm 40 and movable contact 31. From there the electrical energy may flow either to the stationary contact 32 or the stationary contact 34, depending upon the actuated position of the movable contact 31. If the contact 31 is touching the contact 34, then the electrical energy may flow through the connector 42 to a timer motor 44, FIGURE 7, for example, and then to wire or line L". If the movable contact 31 is in contact with stationary contact 32, the electrical energy may flow through the connector 46, through certain connections 47 in the timer 48, well known in the art, then through either a hot water solenoid 52 or a cold water solenoid 54 of a water control valve 50 to a line which may be connected to the L" supply. The electrical energy may alternatively flow through both solenoids 52 and 54, if desired. The construction is such that water may be introduced from either the hot water supply pipe 56 and/or the cold water supply pipe 58, or both. The controlled water may be discharged at the nozzle 60 into the tub 28 in a well known manner.

A high pressure control spring construction may include the high pressure spring construction 62 which is effective to determine what relatively high pressure in chamber 24 will cause the pressure member or diaphragm 20 to snap the switch 30 to the high pressure actuated position with the contact 31 touching the contact 34.

A low pressure control spring construction may include the low pressure spring 64 which, under proper positions, determines what relatively low pressure in chamber 24 will cause the pressure member 20 to snap the switch 30 to the low pressure actuated position, with contact 31 touching the contact 32.

Filled water level adjustment means are provided and are movable between a plurality of pressure settings, such as "low" fill, "medium" fill and "high" fill. Such adjustment means may include a multiple position cam 66 which has valleys 68, 70, and 72 into which the engaging part 74 of an actuating arm 76 may enter, and its adjusting knob 79.

These settings, produced by valleys 68, 70 and 72, may be effective upon one of the spring constructions, such as spring construction 62, to select a pressure in response to which the pressure member 20 snaps the switch to the respective actuated position, with contact 31 touching contact 34.

For example, when this construction is applied to the control of a washing machine or the like, and with lever part 74 in valley 68, the construction will control the water fill valve member 50 in a manner to fill the tub 28 to a "low" fill level 26A, which, however, is considered a full tub for the purpose desired. When this level is reached, the snap switch 30 is snapped to high pressure actuated position with contact 31 touching contact 34, to stop the flow of water into tub 28, and to start the timer motor 44. On the other hand, if the part 74 is in the valley 70, then the tub is filled to a position known as "medium" fill level 26B which is slightly higher than the "low" fill level 26A, and when so filled the snap switch 30 is snapped to high pressure actuated position, and stops the flow of water into tub 28. If the part 74 is in the valley 72, then the tub 28 is filled to the "high" fill level 26C and the switch 30 is snapped upwardly to stop the flow of water into tub 28 at "high" fill level. In all of these water fill stopping positions, the switch 30 may simultaneously start the timer motor to produce proper washing machine operations subsequent to the fill operation.

The cam 66 may be turned by a shaft 78 which may be provided with the manually actuated knob 79, so the user can select the desired water fill position.

It is therefore to be seen that the cam 66 is manually adjustable between a plurality of pressure settings. These settings are effective, through the arm 76 and a spring end holder 80, properly to adjust the compression of the spring 62. This adjustment determines what relatively high pressure in chamber 24 will cause pressure member 20 to snap the switch 30 upward to high pressure actuated position. For example, the edge of the cup 82 of spring holder 80 may be moved to the position 84, when lever part 74 is in notch 68. The edge of the cup 82 may be moved to "medium" fill position 86 when the lever part 74 is in notch 70. The edge of the cup 82 may be moved to "high" fill position 88, when the lever part 74 is in notch 72. These various positions adjust the compression in the spring 62 to determine the fill level of the water which is to be supplied in the tub 28.

Means responsive during the movement of the adjusting means 66 between the settings 68, 70 and 72 are provided to maintain or reset the switch 30 in the low pressure actuated position, with contact 31 touching contact 32, as in FIGURE 5.

Figure 6:
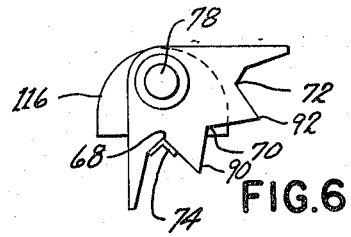
FIGURE 6 is an end view of the adjustable multiple position means or cam and the engaging part of the actuating arm.

During the adjustment between the positions 68, 70 and 72, the hills or lobes 90 and 92, FIGURE 6, of cam 66 become effective upon the lever end 74 to move the lever 76 to its lowermost position, such as indicated at 94, in FIGURE 5. During this adjustment, the lever 76 pushes the edge of the cup 82 to its lowermost position 96, FIGURE 5. When this happens, the bottom 98 of the cup 82 pushes down on the upper end 99 of the adjustment resetting spring 100 with sufficient force to push down the rod 102 contact 31 and diaphragm 20 from whatever position they may have been at the time, to the lowermost position shown in FIGURE 5 and to maintain or reset the switch 30 in the low actuated position with contact 31 touching contact 32.

As soon as the adjustment of cam 66 is completed, and the lever part 74 of lever 76 can move into a selected valley 68, 70 or 72, then the control is ready for the diaphragm 24 and snap switch 30 to respond to a water filling action and to stop the filling action when the air pressure in chamber 20 and the water level in tub 28 reach the value selected by the adjustment of cam 66.

Any suitable constructions may be used to accomplish and perform the foregoing functions.

For example, a homogeneous, electrical insulating, plastic casing 110 may be made with a cylindrical base 112, which may have a tubular upward extension 114. This extension 114 may be of any desired cross section, such as circular, oblong, rectangular, etc. A plate 116 may be hermetically secured to the upper end of the extension 114, such as by screws 118, and the like.

The plate 116 may be provided with an opening 120, through which the stem 80 passes in a manner to produce a restricted passageway 122 between the stem 80 and the opening 120.

The purpose of the restricted passageway 122 is to produce a snubbing cushion of air in the space 124 and the switch space 126. This snubbing cushion of air opposes any sudden upward surge of the flexible member 20 which might otherwise be caused by agitation or other disturbances in the water in the tub 28, which might be likely to produce air surges into and out of the chamber 24, and which might cause the movable contact 31 to flutter because of such surges.

Plate 116 may be provided with a hinge 226 by which the lever 76 is secured thereto. This hinge permits the lever 76 to rock about such hinge. The plate 116 may be provided with an opening 127 or the like, which permits the lever 76 to pass through such opening in the plate 116 from above the plate 116 and extend below the plate 116 so the end 74 of lever 76 may be in engagement with the lobes and valleys of the cam 66.

The upper end 128 of the spring holder 80 may be rounded in shape to provide an effective sliding engagement with the flat end 130 of the adjusting screw 132. The screw 132 is adjustably secured to the lever 76 for calibration purposes. The slight sliding movement between the surfaces 128 and 130 caused by the rocking action of lever 76 does not produce any disturbing lateral movement in the member 80 and thus permits an accurate adjustment of the compression spring 62.

A lower movable member 134 may receive the lower end of the spring 62 as shown. The member 134 may be in the shape of an inverted cup with its rim 136 being downwardly stopped by the stationary surface 138 of the casing 110. Flange 136 also may receive the lower end of spring 62.

The upper flat portion or plate 140 of the member 134 may be threadedly adjustable at 142, for factory calibration of the various spring tensions and compressions. The axial adjustment of the plate 140 may be produced at the factory by the use of a screwdriver or the like in engagement with the slot 144.

Figure 2:
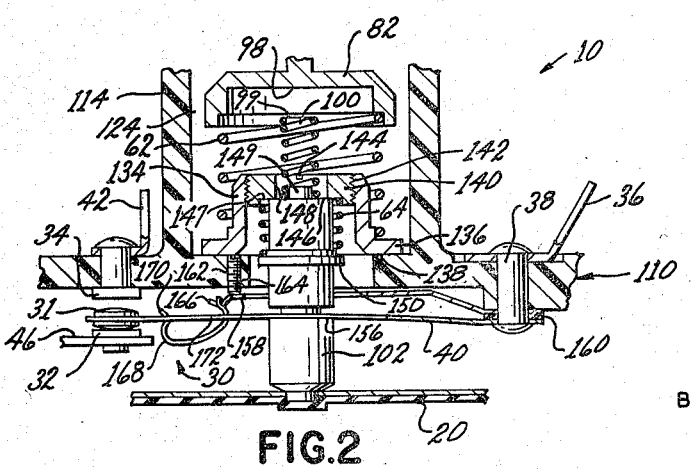
FIGURE 2 shows certain water level control parts of FIGURE 1 moved to positions corresponding to an initial filling stage of the tub with the switch remaining in the low pressure actuated position.

The main upper end 146 of the rod 102 abuts against the under surface 147 of the plate 140, FIGURES 2 and 4, but is movable downwardly from such surface while the cam 66 is being adjusted, as in FIGURE 5, or when the water in tub 28 is at a low level 26 or when the tub 28 is empty as in FIGURE 1.

An opening 148 is provided in the plate 140, through which the spring 100 may pass. The lower end of such spring to be secured to or engages the upper surface 146 of the rod 102. A button 149 may be provided on surface 146 to aid in holding the spring 100.

The upper end of the spring 64 engages or may be secured to the lower surface 147 of the plate 140. The lower end of spring 64 engages or may be secured to a flange 150 of the rod 102.

The flexible diaphragm 20 may be secured between the edge 152 of the casing 110 and the spun flange construction 154 of the metal cover 156, to which the passageway 22 may be secured.

The switch 30 may be an electric snap switch or valve of any desired construction. For example, a switch blade 40 is provided with the double contact 31 at one end and has its other end held by the rivet construction 38. The intermediate part of the blade 40 engages the rod 102 in a circular notch or groove 156, which provides a slight play in the engagement of the blade 40 with the rod 102. This slight play permits free and active movement of the blade 40 to produce a snapping action of the blade 40.

Another switch blade 158 is secured at one end by the rivet construction 38, with any suitable washer construction 160 spacing the blades 40 and 158. The blade 158 is relatively rigid, but slightly spring-like in construction. An adjusting screw 162 may pass through the upper wall of the casing 110, and the screw end 164 engages the blade 158 and adjusts the height of the tongue construction 166 to calibrate the snapping action of the blade 40 which is produced by the C-spring construction 168. This calibration may be made by a screwdriver at the factory before the cup-like member 134 is assembled in the controller.

The C-spring 168 engages another tongue construction on blade 40 at 170 as is well known. The blade 40 may be provided with a suitable opening 172 which permits the movement of the spring 168, and also receives the end 166 of the blade 158.

The compression of the spring 168 is such that the rod 102 must lift the flange 136 of the member 134 to the dotted line position, FIGURE 3, slightly above the surface 138, in order to snap the contact 31 upwardly from its lower position to its upper position in response to air pressure in the chamber 24 produced when the tub 28 is filled to the selected fill level. The rod 102 and the diaphragm 20 must be subjected to a sufficiently high air pressure in the chamber 24 to lift the member 134 and its flange 136 from the surface 138 as shown in dotted lines, FIGURE 3. This lifting action must be accomplished against the adjusted compression of the spring 62, which is a relatively strong spring as compared to relatively weak spring 64. Therefore, the upward snapping action of the switch blade 40 can only occur when the tub is filled to the selected level and the pressure in chamber 24 overcomes the compression force of the spring 62 and other minor forces, such as those produced by C-spring 168.

The spring 64 is a relatively weak spring, and has only a negligble compression value, as compared to the compression of the spring 62.

The upward snap of the blade 40 and contact 31 in FIGURE 3 stops the filling action of water valve 50 and starts operation of the timer motor 44 and timer 48 when the tub 28 has been filled to the selected level, such as "low," "medium" or "high" fill.

After the tub 28 has been filled to the desired level 26A, 26B, or 26C, the washing operation is produced by a plurality of proper washing machine components 55, 57, etc., FIGURE 7, under the control of the timer 48. Thereafter, the tub 28 is emptied by the opening of a drain valve 59 or actuation of a drain pump 261, or both, under the control of the timer 48. A by-pass circuit 61 is energized from another line L' by the timer during the washing action to maintain the timer motor 44 in operation when the switch blade 31 is snapped down against contact 32 by the emptying of the tub, and the like, and it is desired to spin the basket of the washing machine or to produce any other operation of the machine. The by-pass 61 is deenergized by the timer in the fill position, to arrest the timer during the filling operation, as is well known. While the tub 28 is being emptied after a washing action or the like, the pressure in chamber 24 gradually drops from the original high pressure which caused the upward snap action of the contact 31 to its upper position. This gradual decrease in the pressure of chamber 24 permits the spring 62 to push the member 134 downwardly until the flange 136 rests on the surface 138, as shown in FIGURE 4. Thereafter the compression of spring 62 becomes completely ineffective to move the rod 102 in a further downward direction, since the downward movement of the spring 62 is arrested when the flange 136 seats on the surface 138.

As the water in tub 28 continues to be emptied after the flange 136 has seated on surface 138, the pressure in chamber 24 continues to decrease until such time when the compression force of the weak spring 64 is sufficient to overcome the spring tension of C-spring 168 and any other resisting forces such as the relatively low pressure in chamber 24. When a critical relatively low pressure in chamber 24 is reached, such as when the level of water in tub 28 falls to level 26, FIGURE 7, the spring 64 causes the blade 40 and the contact 31 to snap down to the low pressure actuated position with the contact 31 touching the contact 32, as shown in FIGURE 1.

This last mentioned snapping action, produced by the gradual emptying of the tub 28 always occurs at the same relatively low pressure, which is determined by the action of the spring 64 without any influence from strong spring 62. This constant low pressure action is entirely independent of the compression force of the spring 62, since the spring 62 has become completely ineffective to produce any downward force on the rod 102 after the flange 136 seated on the surface 138. The controller can be calibrated by adjusting plate 140 to obtain the desired constant low pressure at which the switch 31 resets during the tub emptying procedure. The effective pressure of spring 64 is calibrated by adjustment of plate 140.

When the cam 66 is adjusted or rotated from one setting to another setting, the lobes 90 or 92 push the end 74 of the lever 76 down to the position 94, with the rim of the cup 82 moving down to the position 96, and with the surface 98 of the cup 82 pushing down on the upper end 99 of spring 100. The lever 76 pushes down a sufficient distance, so that lever 76 imparts sufficient force to spring 100 to overcome any resistance which may be produced by the pressure in the chamber 24 or the spring action of C-spring 168, so that the rod 102 is pushed down to its lowermost position. At this position the rod 102 moves the blade 40 and contact 31 down to low pressure actuated position so it is touching the contact 32. This position is maintained by the action of the lobes 90, 92 and the spring 100, during the entire period of time that the lobes are passing over the member 74. This maintains the contact 31 touching the contact 32 and resets the switch, so that the contact 31 remains in touching engagement with the contact 32 ready to fill the tub 28 to a higher selected water level after the cam is adjusted to the new fill level position. This resetting action is of value when the cam 66 is adjusted from a lower pressure position (valley 68) to a higher pressure position, such as to valley 70 or 72.

For example, when an adjustment is made from valley 68 to valley 70 after the tub 28 has previously been filled to fill level 26A and has satisfied the requirements of valley 68, ordinarily the switch construction will not reset unless a downward push is provided by the lobe 90, since the pressure in chamber 24 is sufficiently high to prevent the resetting action from taking place without the lobe action. Likewise, when an adjustment is made from valley 70 to the valley 72, no resetting action can take place, unless the lobe action of lobe 92 is provided to push the switch down to the reset condition.

The spring tensions, length of travel etc. are made so that at the start of a filling action, as the pressure in the chamber 24 starts to increase, the contact 31 remains in its lower position touching the contact 32, as in FIGURE 1. As the tub fills, and the pressure in chamber 24 increases, the diaphragm 20 starts to move upwardly from its lower position of FIGURE 1 and moves gradually upward as the tub fills, while only the spring 64 provides any spring tension, in addition to the spring tension of C-spring 168. However, a time is reached when the water level in the tub and the air compression in chamber 24 cause the top surface 136 of the rod 102 to engage the bottom of plate 140, as in FIGURE 2. Thereafter a pushing action is then produced on the member 134 tending to push it further upward, as in the full line position of FIGURE 3. At this time, the spring 62 begins to oppose such upward movement, depending upon its compression strength, as determined by the position the lever 76 and by the cam 66. As the tub continues to fill, a time is reached when the pressure in chamber 24 is sufficient to lift the flange 136 farther and farther from the surface 138, so that the compression of spring 62 is then further increased. When a predetermined distance of lift of flange 134 from the surface 138 is reached as at the dotted line position of FIGURE 3, blade 40 has reached a level so that the blade 40 snaps from its full line position to its dotted line high pressure position with the contact 31 touching the contact 34. This upward snap occurs substantially at the same spacing of the flange 136 from the surface 138 regardless of the fill setting of cam 66. Also, if the cam 66 is not adjusted from one position to the other, this upward action always takes place when the tub 28 is filled to the same fill level which has been set by the cam 66. However, if the cam 66 is moved to a higher pressure, such as to use 70 or 72, this will require a higher pressure in the chamber 24 and a higher level of water in the tub 28 to move the member 134 up to the same snapping position which previously occurred when the cam was in position 68.

Certain words are used herein which indicate direction, relative position, etc., for the sake of brevity and clearness. However, it is to be understood that such words are used to describe the illustrations in the drawings, and that the actual devices so described may have entirely different direction, relative position, etc., in actual use. Examples of such words are "vertical," "horizontal," "upper," "lower," etc.

It is thus to be seen that a control has been provided which can be adjusted to select a plurality of high pressure or fill level positions. The electrical snap acting switch 30, energy controller or valve, is moved to the high pressure position when the tub or other member is filled to the desired pressure or fill level, and then the filling action is automatically stopped. Thereafter when the tub or other member is being emptied, the switch 30, energy controller or valve is moved back or is reset to the low pressure position when the pressure or water level reaches a predetermined and constant pressure or water level. This is very advantageous when washing certain fabrics.

This predetermined and constant pressure may be carefully calibrated to any desired pressure by the calibration of plate 140 to obtain the desired reset value of the spring 64.

The switch 30, energy controller or valve is also independently maintained or reset in the low pressure position when the manual selecting member, such as cam 66 is adjusted from one selected position to another.

While the form of the invention now preferred has been disclosed as required by the statues, other forms may be used, all coming within the scope of the claims which follow.

What is claimed is:

1. In combination: a flexible diagram movable in response to varying relatively high and relatively low pressures applied thereto; an actuating rod connected to and movable longitudinally by said diaphragm; a snap switch connected to and snapped by said rod between a low pressure actuated position and a high pressure actuated position, as said rod is moved longitudinally by said diaphragm; a movable platform stopped in an arrested position by an arresting member and movable from said arresting member to other positions by engagement by said rod; a high pressure control spring construction having one spring end engaging said platform and forcing said platform toward said arresting member; an adjustable cam having a plurality of different depth pressure selecting valleys and intermediate resetting lobes; a spring holder receiving the other spring end of said high pressure control spring construction and being movable by said valleys and adjustment of said cam to compress said high pressure control spring construction to selected pressures, and being movable by said lobes to switch resetting position; a low pressure spring having one spring end engaging said platform and its other spring end engaging said rod to reset said switch to its low pressure actuated position when said movable platform is stopped by said arresting member and the pressure on said diaphragm is reduced below a constant low pressure value established by said low pressure spring; and a resetting member positioned between said rod and said spring holder and effective when said holder is in resetting position to reset said switch in low pressure actuated position, and in which said resetting member is a spring carried at one end by said rod and having its other end engaged by said spring holder.

2. In combination: a flexible diaphragm movable in response to varying relatively high and relatively low pressures applied thereto; an actuating rod connected to and movable longitudinally by said diaphragm; a snap switch connected to and snapped by said rod between a low pressure actuated position and a high pressure actuated position, as said rod is moved longitudinally by said diaphragm; a movable platform stopped in an arrested position by an arresting member and movable from said arresting member to other positions by engagement by said rod; a high pressure control spring construction having one spring end engaging said platform and forcing said platform toward said arresting member; an adjustable cam having a plurality of different depth pressure selecting valleys and intermediate resetting lobes; a spring holder receiving the other spring end of said high pressure control spring construction and being movable by said valleys and adjustment of said cam to compress said high pressure control spring construction to selected pressures, and being movable by said lobes to switch resetting position; a low pressure spring having one spring end engaging said platform and its other spring end engaging said rod to reset said switch to its low pressure actuated position when said movable platform is stopped by said arresting member and the pressure on said diaphragm is reduced below a constant low pressure value established by said low pressure spring; and a resetting member positioned between said rod and said spring holder and effective when said holder is in resetting position to reset said switch in low pressure actuated position, and in which a portion of said platform includes an adjustable plate adjustable on said platform which plate is engaged by said one spring end of said low pressure spring and adjustment of said plate calibrates said low pressure spring to obtain the desired constant low pressure value at which said switch resets while the pressure on said diaphragm is being reduced.

3. A combination according to claim 2 in which said arresting member is a casing for supporting said diaphragm, and said platform is a cup shaped member with its rim engaging said casing and being engaged by said one end of said high pressure control spring construction, and in which the bottom of said cup shaped member is longitudinally adjustable and is engaged by said one end of said low pressure spring to provide a factory adjustment of said low pressure spring.

4. In combination: a flexible diaphragm movable in response to varying relatively high and relatively low pressures applied thereto; a snap switch; means to snap said snap switch by said diaphragm between a low pressure actuated position and a high pressure actuated position; a high pressure control spring construction means acting on said diaphragm to determine the relatively high pressure causing said diaphragm to snap said switch to said high pressure actuated position; a low pressure control spring construction means acting on said diaphragm to determine the relatively low pressure causing said diaphragm to snap said switch to low pressure actuated position; adjustment means movable to a plurality of pressure settings and adjusting the pressure of one of said spring construction means to select a pressure in response to which said diaphragm snaps said switch to the respective actuated position; and means responsive during the movement of said adjustment means to said settings to maintain said switch in the other actuated position, and in which an adjustable calibrating member is provided which engages said low pressure control spring construction means and calibrates the relatively low pressure causing said diaphragm to snap said switch to low pressure actuated position.

5. In combination: a pressure member movable in response to varying relatively high and relatively low pressures applied thereto; a snap switch; means to snap said snap switch by said pressure member between a low pressure actuated position and a high pressure actuated position; a high pressure control spring construction means acting on said pressure member to determine the relatively high pressure causing said pressure member to snap said switch to said high pressure actuated position; a low pressure control spring construction means acting on said pressure member to determine the relatively low pressure causing said pressure member to snap said switch in said low pressure actauted position; adjustment means movable to a plurality of pressure settings and adjusting the pressure of one of said spring construction means to select a pressure in response to which said pressure member snaps said switch to the respective actuated position; and means responsive during the movement of said adjustment means to said settings to maintain said switch in the other actuated position, and in which said adjustment means is a user manipulator means which adjusts the spring tension in said high pressure control spring construction means without adjusting the spring tension on said low pressure control spring construction means, and in which calibrating means are provided for calibrating the spring tension in said low pressure control spring construction means without calibrating the spring tension in said high pressure control spring construction means.

6. In combination: a pressure member movable in response to varying relatively high and relatively low pressures applied thereto; an energy controller; means to move said energy controller by said pressure member between a low pressure actuated position and a high pressure actuated position; a high pressure control spring construction means acting on said pressure member to determine the relatively high pressure causing said pressure member to move said energy controller to said high pressure actuated position; a low pressure control spring construction means acting on said pressure member to determine the relatively low pressure causing said pressure member to move said energy controller to said low pressure actuated position; adjustment means movable to a plurality of pressure settings and adjusting the pressure of one of said spring construction means to select a pressure in response to which said pressure member moves said energy controller to the respective actuated position; and means responsive during the movement of said adjustment means to said settings to maintain said energy controller in the other actuated position, and in which said adjustment means is a user manipulator means which adjusts the spring tension in said one of said spring construction means without adjusting the spring tension on the other of said spring construction means, and in which calibrating means are provided for calibrating the spring tension in said other of said spring construction means without calibrating said one of said spring construction means.

7. A switch construction comprising: a pressure operated diaphragm; pressure chamber forming means connected to said diaphragm to form a pressure chamber on one side of said diaphragm; a snap switch including a switch member movable between a low pressure actuating position and a high pressure actuating position; an actuating member connected between said diaphrgam and said switch member; a relatively strong spring and relatively weak spring effective upon said actuating member for determining response of said diaphragm; a limiting stop between said springs for limiting the movement of said strong spring and determining the low pressure at which said diaphragm is effective to operate said switch; a plural position adjusting mechanism connected to said strong spring to determine the high pressure at which said diaphragm is effective to operate said switch; and adjustment responsive reset means responsive to adjustment of said adjusting mechanism to reset said switch member in low pressure actuating position during said adjustment when said switch is in said high pressure actuating position, and in which calibrating means is provided in said limiting stop to calibrate the switch actuating spring tension of said relatively weak spring without calibrating the switch actuating spring tension of said relatively strong spring, and in which said plural position adjusting mechanism adjusts the switch actuating spring tension of said relatively strong spring without adjusting the switch actuating spring tension of said relatively weak spring.

References Cited by the Examiner
UNITED STATES PATENTS

| | | | |
|---|---|---|---|
| 2,636,093 | 4/53 | Clark et al. | 200—83 |
| 2,921,159 | 1/60 | Elderton et al. | 200—83 |
| 2,941,055 | 6/60 | Sussin | 200—83 |
| 3,110,784 | 11/63 | Williams et al. | 200—83 |

BERNARD A. GILHEANY, *Primary Examiner.*